United States Patent

[11] 3,619,794

| [72] | Inventor | Peter L. Richman |
| | | 22 Barberry Road, Lexington, Mass. 02173 |
| [21] | Appl. No. | 11,179 |
| [22] | Filed | Feb. 13, 1970 |
| [45] | Patented | Nov. 9, 1971 |

[54] METHOD AND SYSTEM FOR DETECTING NOISE-CONTAINING SIGNALS
23 Claims, 3 Drawing Figs.

[52] U.S. Cl. ................................................. 328/165,
328/197, 307/231, 328/151, 328/26, 328/144
[51] Int. Cl. .................................................. H03b 1/04,
H03k 17/60
[50] Field of Search ........................................... 328/179,
26, 165, 151, 144; 307/229, 242, 231

[56] References Cited
UNITED STATES PATENTS
3,205,347  9/1965  Wright .......................... 328/144
2,887,576  5/1959  Harmuth ....................... 328/144
2,287,334  6/1942  White ........................... 328/26
2,668,910  2/1954  Starr ............................ 328/26

*Primary Examiner*—Donald D. Forrer
*Assistant Examiner*—Harold A. Dixon
*Attorney*—Michael P. Breston ABSTRACT: This invention concerns detectors or rectifiers which are insensitive to superimposed noise, as well as to DC and varying DC signals. The detectors of this invention provide insensitivity to higher-order time functions by gating with different gain factors the successive half-cycles, or successive groups of half-cycles, in the input AC signal, the AC value of which it is desired to detect. The insensitivity can be extended as well to sums of higher-order time functions. The invention is particularly adapted to high-speed AC measurements in situations whose characteristics include noise, drift, or "drool" phenomena.

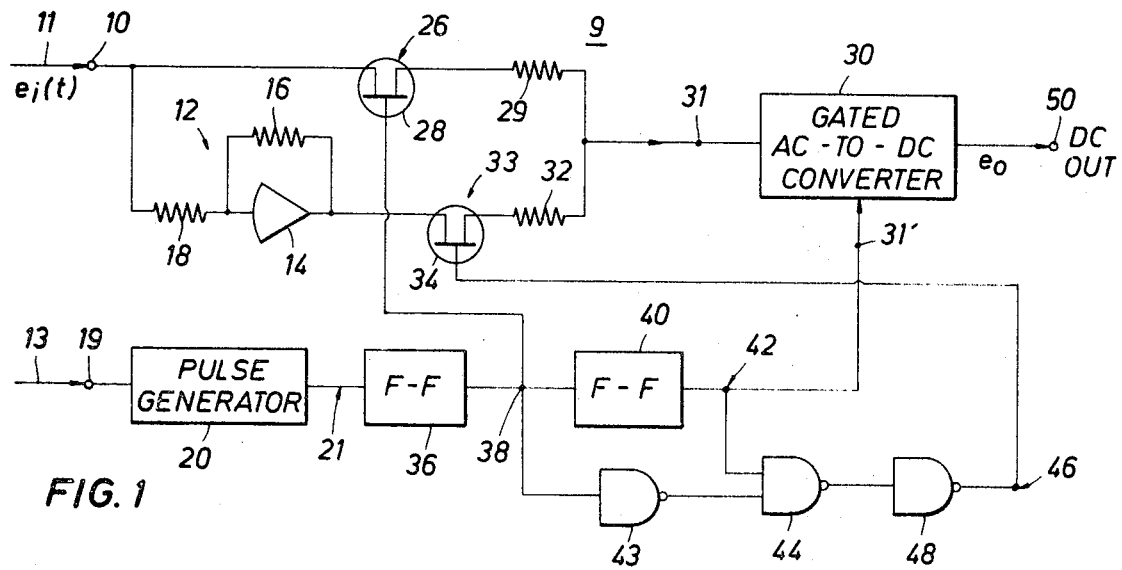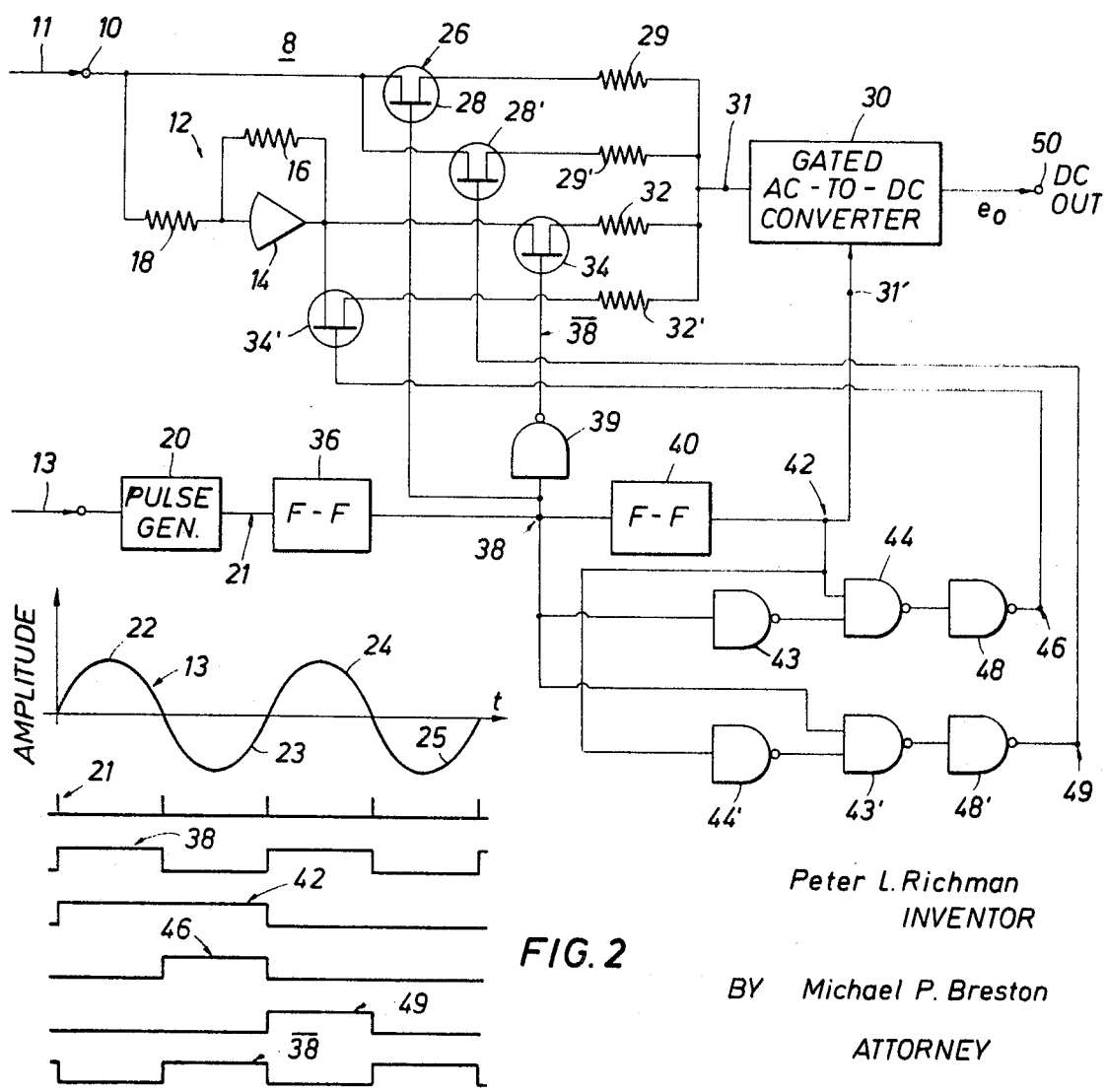

METHOD AND SYSTEM FOR DETECTING NOISE-CONTAINING SIGNALS

BACKGROUND OF THE INVENTION

In many electronic systems, the AC signals become combined with low-frequency noise, such as flicker noise, which is typically generated by active elements, as photomultipliers, transistors, electromechanical switching devices, etc. Frequently also the AC signals become combined with DC or varying DC signals.

In conventional full-wave detection, for example, a full-wave gated detector operates on the input signal $e_i(t)$ to furnish an output $e_0(t)$, as follows:

$$e_0 = \frac{1}{T}\left\{\int_0^{\frac{T}{2}} e_i(t)\,dt - \int_{\frac{T}{2}}^{T} e_i(t)\,dt\right\} \quad (1)$$

where:

$T$ is the period of the fundamental of the input signal $e_i(t)$, and $t$ is time.

In other words, $e_0$ is obtained by adding the average of the input signal $e_i$ over the first half period to the negative of the average of $e_i$ over the second half period. But if $e_i$ contained not only a sine wave $E_i\sin(wt)$ (where $w=2\pi/T$), but also terms of the form $a+bt+ct^2+dt^3$ ... and so forth, which terms represent low frequency noise, the conventional average defined by equation (1) would yield:

$$e_0 = 2E_i/\pi - bt/4 - ct^2/4 - 7d/32\, t^3 \quad (2)$$

From equation (2) it can be seen that: $2E_i/\pi$ is the average value of the full-wave fundamental; constant term $a$ vanishes; and the $t, t^2, t^3$... and higher-order time terms, with coefficients $b, c, d...$, respectively, contribute error terms to the average value. It can be shown that $e_0$ for gated half-wave rectification also contains significant error terms in $b, c, d$, etc., as well as the constant term $a$.

Accordingly, it is a main object of this invention to detect an incoming AC signal in a manner which is independent of terms in the form of $a_n t^n$, where $n=0$ or any finite value, that is, which is substantially independent of low-frequency (flicker $1/f$) noise combined with the input AC signal.

The invention is not limited to sine waves. The incoming signal can be a cosine wave, the sum of a sine and cosine wave, a square wave, triangular wave, trapezoidal wave, clipped sine wave, etc.

SUMMARY OF THE INVENTION

The detection of an AC signal in accordance with this invention is based on adding, with suitable gain factors, the gated averages of successive half-cycles, or successive groups of half-cycles, of the input AC signal $e_i(t)$. Using a sufficient number of such half-cycles, or groups of half-cycles, terms in the form of $a_n t^n$ may be completely eliminated from the detected output. Since low-frequency noise can be represented, over a given interval, by a power series in $t$, the elimination of the $t$ terms effectively eliminates noise from the detected output signal $e_0(t)$.

For example, gating with gains of 1, −2, 1 and 0 for successive half-cycles assures insensitivity to a noise time function in the form of $(a+bt)$ which is superimposed on the input AC signal $e_i(t)$. Gating with other groups of gain factors can assure insensitivity to higher order noise time functions. Accordingly, high-speed AC measurements can now be effected without elaborate filtering networks required by accurate prior art detectors.

BRIEF DESCRIPTION OF THE DRAWINGS

FIG. 1 shows one embodiment of a detector system in accordance with this invention;

FIG. 2 shows certain waveforms obtained in the system of FIGS. 1 and 3; and

FIG. 3 shows another embodiment of a detector system.

Referring now to FIGS. 1 and 2, there is shown a detector 9 for eliminating the effects of zero and first order terms in $t$ contained in the input signal 11 to be detected. Signal 11 is applied to an input terminal 10. Signal 11 is inverted by an inverting feedback amplifier 12, comprising an amplifier 14, a feedback resistor 16, and an input resistor 18. Resistors 16 and 18 have equal resistance values.

A reference signal 13, having the same frequency as the frequency of the periodic component of the input signal 11, is applied to another input terminal 19. Signal 13 is shown in FIG. 2 as being a sine wave, although it will be appreciated that signal 13 can be any periodic reference wave having the same frequency as the frequency of the periodic component in the input signal 11.

Signal 13 is fed to a pulse generator 20 which detects the zero-crossing points in the reference signal 13 and provides corresponding output pulses 21. The first four consecutive half-cycles of signal 13 are denoted as 22, 23, 24, and 25, respectively, with required gains of 1, −2, 1, and 0, respectively.

A gain of 1 for half-cycles 22 and 24 is achieved by gating the input signal 11 via a switching network 26 which can be an FET transistor 28. FET 28 is connected to the input 31 of a gated AC-to-DC converter 30 through a resistor 29. Converter 30 is an explicit integrator-divider or averager, several types of which are known in the art.

Converter 30 functions to integrate the total input signal applied to its input terminal 31 over the four half-cycles 22–25, and to divide by time as determined by a timing control signal 42 applied to its other input terminal 31'. The manner of generating control signal 42 will be subsequently described.

A gain of −2 for half-cycle 23 is achieved by gating via a resistor 32 the output of inverter 12 to input 31. Since $R_{32}=(½)R_{29}$, the desired gain of −2 is achieved. A switch 33, such as an FET transistor 34, is coupled between resistor 32 and inverter 12.

The manner of gating FET switches 28 and 34 will now be described. The train of pulses 21 is applied to a flip-flop network 36, the output wave train 38 of which changes states at the occurrence of each pulse 21. Thus, on the first pulse 21, output 38 is positive going; on the second pulse 21, output 38 is negative going, etc. Wave train 38 is applied to another flip-flop 40 which produces the output wave train 42.

Signal 38, after being inverted by a NAND-gate 43, is applied to another NAND-gate 44 together with pulse train 42. The output pulse of gate 44 is inverted by a NAND-gate 48 to provide a positive pulse 46 during the second half-cycle 23.

Pulse train 38 is applied to the gate electrode of FET switch 28, thereby turning it ON during the positive-going pulses of train 38: switch 28 is therefore ON only during the first and third half-cycles 22 and 24 of reference signal 13. Pulse signal 46 is applied to the gate of FET switch 34, thereby turning it ON only during the second half-cycle 23. Both FET switches 28 and 34 are OFF during the fourth half-cycle 25, hence the gain factor is 0.

Referring now to FIGS. 2 and 3, there is shown a block diagram of a detector 8 for eliminating the effects of up to second order terms in $t$. The gain factors now required for half-cycles 22, 23, 24, and 25 are 1, −3, 3, and −1, respectively. To show the similarity between the detectors of FIGS. 1 and 3, similar elements are designated with like characters. The operation of like elements will not be repeated.

The output of amplifier 14 drives FET switches 34' and 34 employed to furnish the required negative gain factors. Pulse train 38 is applied to the gate of FET 28 to apply the input signal 11 via resistor 29 to the input 31 of converter 30 during half-cycles 22 and 24.

Signal 38 is also inverted by a NAND-gate 39 into an inverse signal $\overline{38}$ which gates ON FET 34. FET 34 is driven by the inverted input signal 11 during half-cycles 23 and 25. Since resistor 32 equals resistor 29, the gain for the inverted signal 11 via resistor 32 is −1 during half-cycles 23 and 25.

In addition to the signal paths through FET switches 28 and 34, auxiliary pulse gates, one for the second half-cycle 23 and one for the third half-cycle 24, are required to bring the gain factors up to −3 and 3, respectively. The auxiliary gate for half-cycle 23 is generated via the coincidence of $\overline{38}$, derived from the output of NAND-gate 43, with pulse train 42, derived from flip-flop 40. The result of this coincidence in NAND-gate 44 produces an inverted signal $\overline{46}$ which is again inverted by NAND-gate 48 into signal 46.

The required auxiliary gate during half-cycle 24 is derived from the coincidence of 38 and inverted $\overline{42}$ which is obtained from NAND-gate 44′. The result of this coincidence is an inverted signal $\overline{49}$ produced by NAND-gate 43′. Signal $\overline{49}$ is again inverted by NAND-gate 48′ to produce signal 49.

Auxiliary gate 46 drives FET switch 34′ which connects the inverted input signal $\overline{11}$ via resistor 32′ during the second half-cycle 23. Since $R_{29}=2R_{32}′$, the gain through resistor 32′ is −2. When added with the gain of −1 via resistor 32, a total gain −3 is obtained during the second half-cycle 23.

Similarly, auxiliary gate 49 drives FET switch 28′ which connects the input signal 11 via resistor 29′ during the third half-cycle 24. Since $R_{29}=2R_{29}′$, the gain via resistor 29′ is 2 during the third half-cycle 24. By combining the gain of 1 via FET switch 28 with the gain of 2 via FET switch 28′, a combined gain of 3 is obtained during the third half-cycle 24. Accordingly, the required gains of 1, −3, 3, and −1 are thus obtained.

Various modifications will readily become apparent to those skilled in the art. For example, separate gates can be employed to obtain totally independent paths for the required gains for each of the four half-cycles 22 through 25.

Accordingly, the present invention can provide insensitivity to higher order time functions by gating the input signal with different gain factors for different numbers of half-cycles or groups of half-cycles. As previously stated, gating with gains of 1, −2, 1 and 0 for successive four half-cycles yields insensitivity to a power time series in the form of $(a+bt)$ superimposed on the input AC signal. By gating with a group of four gain factors of 1, −3, 3, and −1, one obtains insensitivity to $(a+bt+ct^2)$ superimposed on the AC signal. The number of cycles required in each group depends on the exponent of the highest time term $t$ desired to eliminate. For example, four half-cycles are employed to eliminate the first or first and second order terms in $t$; six half-cycles to eliminate, in addition, third and/or third and fourth order terms in $tX$, and so on.

It should be noted that a conventional full-wave rectifier requires only a group of two half-cycles: the first with a gain of 1 and the second with a gain of −1.

Gain variations are possible. For example, all the signs of the gain factors can be changed, in which case the detected output signal $e_o$ is negative instead of being positive. Another alternative is to reverse the order of the required gain factors, say from 1, −2, 1 and 0 to 0, 1, −2, and 1.

Still another alternative is to reduce the number of required half-cycles per group, say from four to three, with gains of 1, −2, and 1 for the first group of three half-cycles, gains of −1, 2, and −1 for the second group of half-cycles, and gains of 1, −2, and 1 for the third group of half-cycles, etc. While this method changes the rectification into a six half-cycle system, the basic structure of the gain alternations, or the basic relationships among the gains of successive cycles does not change.

The preceding statements regarding the number of required half-cycles and their associated gain factors may be obtained by performing explicit integrations. One such integration will now be illustrated for the elimination of effects of up to first order time terms in $t$ for which four half-cycles are used with associated gain factors of 1, −2, 1 and 0.

$$\text{Let } e_i(t) = E_i \sin wt + a + bt$$

i.e., zero order term $a$ and first order term $bt$ are added to the main sine wave input term $E_i \sin wt$ desired to be detected. Using the four half-cycles and associated gains:

$$e_0 = \frac{1}{2T}\left\{\int_0^{\frac{T}{2}} e_i(t)dt - 2\int_{\frac{T}{2}}^{T} e_i(t)dt + \int_T^{\frac{3T}{2}} e_i(t)dt\right\}$$

Now $$\int e_i(t)dt = \int (E_i \sin wt + a + bt)dt$$
$$= -\frac{E_i}{w}\cos wt + at + \frac{bt^2}{2}$$

and since $w = 2\pi/T$, $$\int e_i(t)dt = -\frac{T}{2\pi} E_i \cos wt + at + \frac{bt^2}{2}$$

Hence $$e = \frac{1}{2T}\left\{-\frac{TE_i}{2\pi}(-1-1-2-2-1-1)\right.$$
$$+ a\left(\frac{T}{2} - 2T + 2\left(\frac{T}{2}\right) + \frac{3T}{2} - T\right)$$
$$\left.+ \frac{b}{2}\left(\frac{T^2}{4} - 2T^2 + \frac{2T^2}{4} + \frac{9}{4}T^2 - T^2\right)\right\}$$

But all of the terms associated with $(a)$ sum to zero, as do all of the terms associated with $(b/2)$. Hence, $e_o = 2E_i/\pi$.

A similar analysis will show that for the elimination of terms in $t$ with up to second order exponents in $t$, four half-cycles can be used with associated gains of 1, −3, 3 and −1.

While the total "net area" under the detected wave with the method of this invention can become greater than that obtained with a conventional full-wave rectifier, the difference in result can be eliminated by a suitable constant scaling factor. For example, in the case of the group of gains of 1, −3, 3, and −1, a scaling factor of one-fourth rather than one-half is used for the overall division of the integrated area by the total period T.

Similarly for the elimination of effects of time terms in $t$ with up to the third order exponent, six half-cycles are employed with gains of 1, −4, 6, −4, 1, and 0. For the elimination of effects with up to the fourth order exponent, six half-cycles with gains of 1, −5, 10, −10, 5 and −1 are employed. In both of these latter cases the final detected output signal, when properly scaled down, is the same as that obtained with conventional full-wave detectors or rectifiers, as though the superimposed additive noise terms $a_n t^n$ were not present. The scaling down factors for the two examples above given (third and fourth order exponents) are three-eighths and three-sixteenths respectively. Using such scaling down factors, the conventional detected DC output $e_o = 2E_i/\pi$ is achieved at output terminal 50 in FIGS. 1 and 3.

The method of this invention can be extended for the elimination of terms in $t$ up to any desired exponent by extending the selection of half-cycles or groups of half-cycles and their associated gains.

What is claimed is:

1. A method of performing gated rectification of an input AC signal to obtain therefrom a DC output signal, said AC signal being affected by certain characteristics, said method including the steps of:
   providing a reference AC signal whose frequency is related to the frequency of said input AC signal;
   selecting a sequence of at least three groups of half-cycles from said reference AC signal, each group including at least one half-cycle of said reference signal, and each half-cycle having a distinct factor associated therewith;
   generating gating signals from said groups of half-cycles; and
   performing said gated rectification with said gated signals thereby rendering said output DC signal substantially independent of selected ones of said characteristics.

2. The method of claim 1 in which said characteristics are expressible in the form of a time power series having terms $a+bt+ct^2+dt^3+et^4+.....$, where $t$ is time, and each of the coefficients $a$, $b$, $c$, $d$, and $e$ is finite, zero, or any combination thereof.

3. The method of claim 1 wherein said reference AC signal is a periodic signal.

4. The method of claim 3 wherein said reference AC signal is a sinusoidal signal.

5. The method of claim 3 wherein,
the period of said input AC signal is equal to the period of said reference AC signal.

6. The method of claim 1 wherein,
said reference AC signal is a periodic signal having a period equal to the period of said input AC signal; and
said characteristics are expressible in the form of a time power series $a+bt+ct^2+dt^3+et^4+.....$, where $t$ is time, and each of the coefficients $a$, $b$, $c$, $d$, and $e$ may be finite, zero, or any combination thereof.

7. The method of claim 6 wherein,
said half-cycles have successive gain factors of 1, −2, 1, and 0, thereby eliminating the effects on the output DC signal which are contributed by the $a$ and $bt$ terms.

8. The method of claim 6 wherein,
said groups of half-cycles have successive gain factors of 0, 1, −2, and 1, thereby eliminating the effects on the output DC signal which are contributed by the $a$ and $bt$ terms.

9. The method of claim 6 wherein,
said groups of half-cycles have successive gain factors of 1, −3, 3, and −1, thereby eliminating the effects on the output DC signal which are contributed by the $a$, $bt$ and $ct^2$ terms.

10. The method of claim 6 wherein,
said groups of half-cycles have successive gain factors of −1, 3, −3, and 1, thereby eliminating the effects on the output DC signal which are contributed by the $a$, $bt$ and $ct^2$ terms.

11. The method of claim 6 wherein,
said groups of half-cycles have successive gain factors of 1, −2, 1, −1, 2, and −1, thereby eliminating the effect on the output DC signal which are contributed by the $a$ and $bt$ terms.

12. The method of claim 6 wherein,
said groups of half-cycles have successive gain factors of −1, 2, −1, 1, −2, and 1, thereby eliminating the effects on the output DC signal which are contributed by the $a$ and $bt$ terms.

13. The method of claim 6 wherein,
said groups of half-cycles have successive gain factors of 1, −4, 6, −4, 1, and 0, thereby eliminating the effect on the output DC signal which are contributed by the $a$, $bt$, $ct^2$, and $dt^3$ terms.

14. The method of claim 6 wherein,
said groups of half-cycles have successive gain factors of 0, 1, −4, 6, −4, and 1, thereby eliminating the effects on the output DC signal which are contributed by the $a$, $bt$, $ct^2$, and $dt^3$ terms.

15. The method of claim 6 wherein,
said groups of half-cycles have successive gain factors of 1, −5, 10, −10, 5, and −1, thereby eliminating the effects on the output DC signal which are contributed by the $a$, $bt$, $ct^2$, $dt^3$, and $et^4$ terms.

16. The method of claim 6 wherein,
said groups of half-cycles have successive gain factors of −1, 5, −10, 10 −5, and 1, thereby eliminating the effects on the output DC signal which are contributed by the $a$, $bt$, $ct^2$, $dt^3$, and $et^4$ terms.

17. A system for performing gated rectification of an input AC signal to obtain therefrom an output DC signal, said AC signal being affected by certain characteristics, said system comprising:
a first terminal for receiving a reference AC signal whose frequency is related to the frequency of said input AC signal;
first means coupled to said first terminal for deriving from said reference signal a sequence of at least three groups of half-cycles, each group including at least one half-cycle of said reference signal, and each half-cycle having a distinct gain factor associated therewith;
gate generating means coupled to said first means for generating gating signals from said groups of half-cycles;
an input terminal for receiving said input AC signals;
gated signal rectifier means having first, second, and third terminals;
gain-control means coupled between said input terminal and said first terminal of said rectifier means; and
means applying said gating signal to said second terminal of said rectifier means thereby causing said rectifier means to perform said gated rectification, whereby said output DC signal which is obtained from said third terminal is substantially independent of selected ones of said characteristics.

18. The system of claim 17 wherein,
said gain-control means includes switching means, and
means coupled between said gate-generating means and said switching means to operate said switching means, thereby controlling said gain factors.

19. The system of claim 18 wherein,
said gate-generating means includes:
a pulse generator,
at least two flip-flops connected in series, and
a plurality of NAND gates for shaping said gating signals.

20. The system of claim 19 wherein said reference AC signal is a sinusoidal signal.

21. The system of claim 19 in which,
said reference AC signal is a periodic signal having a period equal to the period of said input AC signal; and
said characteristics are expressible in the form of a power series $a+bt+ct^2+dt^3+et^4+.....$, where $t$ is time and each of the coefficients $a$, $b$, $c$, $d$, and $e$ may be finite, zero, or any combination thereof.

22. The system of claim 19 wherein said reference AC signal is a periodic signal.

23. The system of claim 22 wherein the period of said input AC signal is equal to the period of said reference AC signal.